United States Patent Office 3,164,595
Patented Jan. 5, 1965

3,164,595
6-(5-NITRO-2-FURYL)-3-PYRIDAZINONES
Homer Albert Burch and Louis Edmond Benjamin, Norwich, N.Y., assignors to The Norwich Pharmacal Company, Norwich, N.Y., a corporation of New York
No Drawing. Filed Jan. 21, 1964, Ser. No. 339,099
5 Claims. (Cl. 260—250)

This invention relates to novel nitrofuran compounds of the formula:

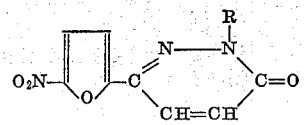

wherein R represents a member of the group consisting of hydrogen and lower alkyl, preferably 1–3 carbon atoms; to methods for the preparation thereof; and to compositions containing them as the active ingredient.

The compounds of this invention are highly active parasiticides and may be employed as the toxic constituent in compositions aimed at the control of microorganisms. They are inimical in small amounts to gram-positive and gram-negative organisms. In the form of dusts, solutions, elixirs, suspensions, tablets and the like employing readily available and conventional excipients and adjuvants as the ingredients thereof, these compounds serve, when incorporated therein, to combat and eradicate bacterial contamination.

These compounds also possess systemic chemotherapeutic properties. When administered per os to mice lethally infected with *Staphylococcus aureus* or *Salmonella typhosa*, protection against mortality is secured by doses of about 110–150 mg./kg. When administered in the diet of chickens infected with *Eimeria tenella* at a level of about 0.022% by weight, protection against the ravages of that infection is obtained.

The compounds of this invention may be readily prepared by the oxidation of a compound of the formula:

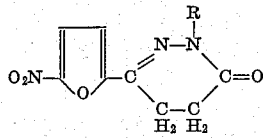

wherein R has the significance hereinabove ascribed. In carrying out this process any suitable oxidant may be used. It is currently preferred to use bromine and glacial acetic acid for this purpose. According to this embodiment the compound to be oxidized is admixed with glacial acetic acid and the mixture treated with bromine preferably under the influence of heat. When the reaction is complete, the mixture is quenched in water and the solid which is formed is filtered. This product conforming to the structural formula first given herein may be recrystallized, if desired. A suitable recrystallizing solvent is dimethylformamide.

In order that this invention may be readily available to and understood by those skilled in the art, the following illustrative examples are supplied:

EXAMPLE I 6-(5-Nitro-2-Furyl)-3(2H)-Pyridazinone

A mixture of NF–910 (4,5-dihydro-6-(5-nitro-2-furyl)-3(2H)-pyridazinone), (41.8 g., .2 mole) prepared by condensing ethyl β-(2-furoyl)propionate with hydrazine hydrate followed by cyclization of the hydrazone thus formed under the influence of heat and nitration of that product, and glacial acetic acid (200 ml.) is placed in a 1 l., 3-neck flask fitted with a thermometer and dropping funnel. The mixture is heated to 90° and heating is stopped. Bromine (2 ml.) is added from the dropping funnel. When hydrogen bromide evolution begins, the remaining bromine (total 32 g., 10.3 ml., .2 mole) is added at such a rate as to maintain a temperature of 90–95° C. When the addition is completed, the mixture is heated at 100° C. (inner temperature) with a heating mantle for 30 mins. The mixture is cooled and diluted with water. The tan solid is collected by filtration and is washed with water. The yield of product (dried at 110° C.) is 39 g. (94%); M.P. 293–295° C. One recrystallization from dimethylformamide (10 ml./g.) gave 32 g. of product; M.P. 289–290° C.

| | C | H | N |
|---|---|---|---|
| Anal. Calcd. for $C_8H_5N_3O_4$ | 46.38 | 2.43 | 20.29 |
| Found | 46.43 | 2.69 | 20.07 |

EXAMPLE II

2-Methyl-6-(5-Nitro-2-Furyl)-3-Pyridazinone

A mixture of 4,5-dihydro-2-methyl-6-(5-nitro-2-furyl)-3-pyridazinone, (47 g., .21 mole), prepared by condensing ethyl β-(2-furoyl)propionate with methylhydrazine followed by cyclization of the hydrazone thus formed under the influence of heat and nitration of that product, and glacial acetic acid (300 ml.) is heated to reflux. Bromine (33.6 g., .21 mole) is added dropwise to the refluxing solution. After about 3 minutes a vigorous reaction occurs and hydrogen bromide is liberated. The mixture is refluxed for 20 minutes after the bromine is added and then it is cooled and diluted with 1 l. of water. The yellow solid which separates is collected by filtration, washed with water, and dried at 100° C. The yield is 41.3 g. (89%); M.P. 220° C.

The product may be purified by dissolving it in hot dimethylformamide (10 ml./g.) and precipating the product by adding water. The yield is 36 g.; M.P. 231–232° C.

| | C | H | N |
|---|---|---|---|
| Anal. Calcd. for $C_9H_7N_3O_4$ | 48.87 | 3.19 | 19.00 |
| Found | 49.13 | 3.21 | 18.85 |

EXAMPLE III

2-Propyl-6-(5-Nitro-2-Furyl)-3-Pyridazinone

A mixture of 25.0 g. (0.12 mole) of the compound of Example I and 6.5 g. (0.12 mole) of sodium methylate in 400 ml. of methanol is refluxed with stirring for ca. 3 hrs. After adding 30 ml. of n-propyl iodide (n-propyl bromide may be used instead of the iodide), the mixture is refluxed overnight. The solvents are removed in vacuo on a steam bath and the residue is shaken with ca. 300 ml. of 5% sodium hydroxide solution. The cold mixture is filtered, and the residue is washed thoroughly with cold water.

Recrystallization of the residue from dilute aqueous ethanol using charcoal gives the title product as yellow needles melting at 103–105° in a yield of 9.7 g. (32.5%). Further recrystallization raises the melting point to 106.5–107.5° C.

| | C | H | N |
|---|---|---|---|
| Anal. Calcd. for $C_{11}H_{11}N_3O_4$ | 53.01 | 4.45 | 16.86 |
| Found | 53.10 | 4.57 | 16.74 |

EXAMPLE IV

2-Ethyl-6-(5-Nitro-2-Furyl)-3-Pyridazinone

A mixture of 50.0 g. (0.24 mole) of the compound of Example I and 13.0 g. (0.24 mole) of sodium methylate in 1 l. of methanol is refluxed with stirring for ca. 3 hrs. After adding 50 ml. of ethyl iodide, the mixture is refluxed overnight. The solvents are removed in vacuo on a steam bath and the residue is shaken with ca. 500 ml. of cold 5% sodium hydroxide solution. The cold mixture is filtered, and the residue is washed thoroughly with cold water. Recrystallization of the residue from dilute aqueous ethanol gives the title product as pale yellow crystals melting at 148–150° C. in a yield of 22.4 g. (39.5%).

Further recrystallization gives a melting point of 149–149.5° C.

|  | C | H | N |
|---|---|---|---|
| Anal. Calcd. for $C_{10}H_9N_3O_4$ | 51.06 | 3.86 | 17.87 |
| Found | 51.06 | 3.79 | 17.73 |

This application is a continuation-in-part of our copending application Serial No. 265,358, filed March 15, 1963, now abandoned.

What is claimed is:

1. A compound of the formula:

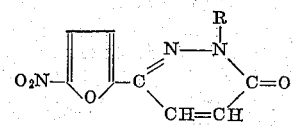

wherein R represents a member of the group consisting of hydrogen and lower alkyl.

2. 6-(5-nitro-2-furyl)-3(2H)-pyridazinone.
3. 2-methyl-6-(5-nitro-2-furyl)-3-pyridazinone.
4. 2-propyl-6-(5-nitro-2-furyl)-3-pyridazinone.
5. 2-ethyl-6-(5-nitro-2-furyl)-3-pyridazinone.

References Cited in the file of this patent

FOREIGN PATENTS 858,792     Great Britain _____ Jan. 18, 1961